July 17, 1956   H. J. STINGER   2,754,678
VIBRATION TESTER

Filed April 22, 1952   2 Sheets-Sheet 1

INVENTOR
HENRY J. STINGER
BY William C. Babcock ATTORNEY

July 17, 1956   H. J. STINGER   2,754,678
VIBRATION TESTER

Filed April 22, 1952   2 Sheets-Sheet 2

INVENTOR
HENRY J. STINGER
BY William C. Babcock ATTORNEY

United States Patent Office 2,754,678
Patented July 17, 1956

2,754,678

VIBRATION TESTER

Henry Joseph Stinger, Wilmington, Del., assignor to General Mills, Inc., a corporation of Delaware Application April 22, 1952, Serial No. 283,680

5 Claims. (Cl. 73—70)

The present application is concerned with testing instruments and particularly with a device for the sensing and measurement of vibrations of low amplitude and frequency.

Thickness gauges have been proposed in the past in which mutual inductance between primary and secondary coils has been utilized for measurement of the thickness of an object or piece of material located between the coils on the one hand and a magnetically permeable support on the other. So far as I am aware, however, such devices have not been developed in a form where the variation in mutual inductance between two coils is used as a measure of both the amplitude and frequency of vibration of a member near which the coils are located.

One object of the present invention is accordingly the provision of an improved vibration sensing and measuring device.

Another object is the provision of such a measuring device in which a variation in mutual inductance between two coils caused by their proximity to a magnetically permeable member is utilized to sense vibration amplitudes as low as ten-millionths of an inch at a frequency range from zero to over twenty thousand cycles.

Still another object is the provision of such a device with means for visual presentation of the amplitude and frequency of such vibrations.

A further object is the provision of an improved vibration sensing and measuring unit in which the primary coil of a mutual inductance pick-up is excited at a radio frequency, while the variations in the secondary coil voltage are utilized to actuate a suitable indicating means.

Still another object is a vibration sensing unit in which voltage variations in such a secondary coil are coupled to an oscilloscope through suitable detector means and a cathode follower.

Other objects and advantages will be apparent from the following specification in which a preferred form of the present invention is described.

Figure 1:
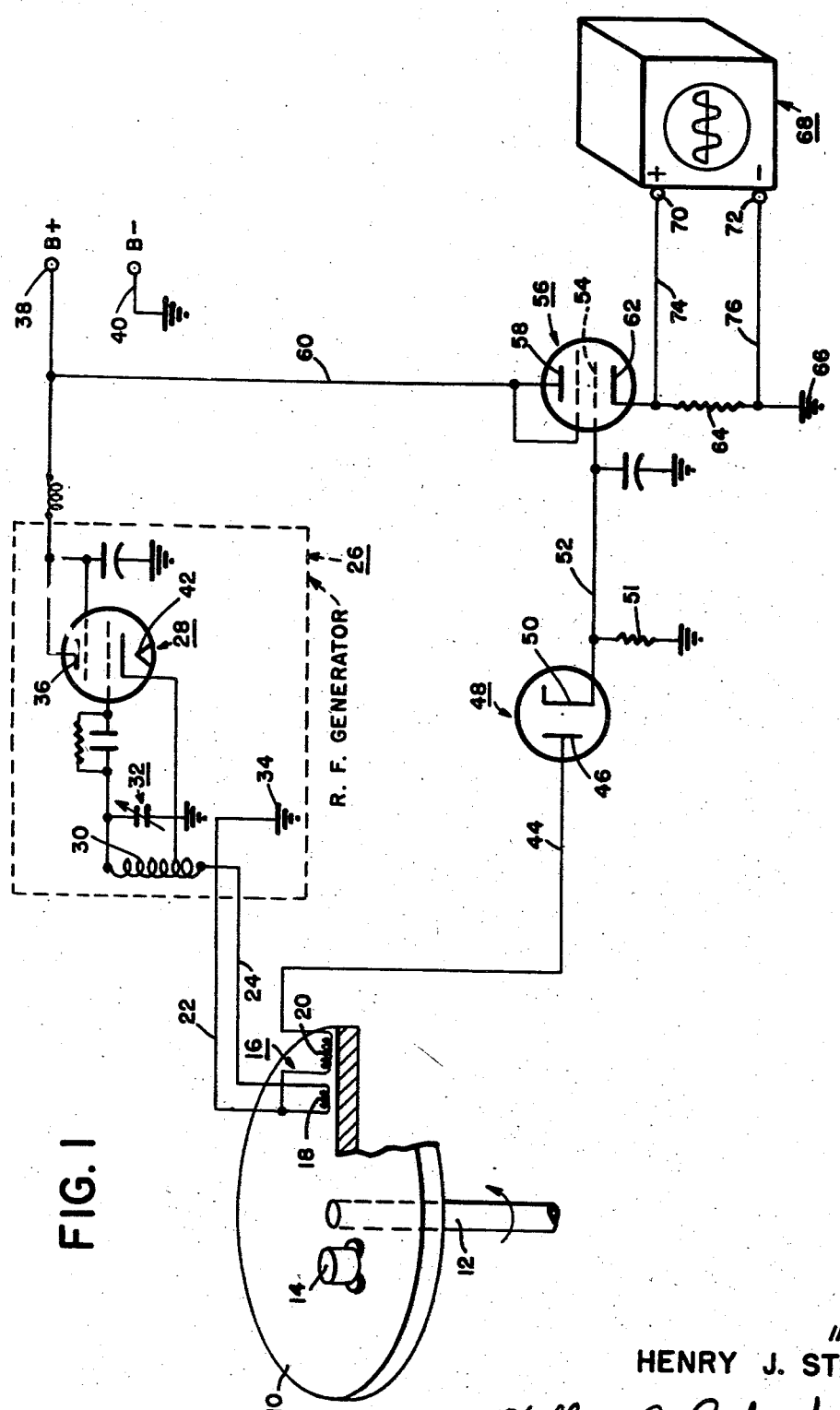

In the drawings forming a part of this application and in which like reference characters indicate like parts, Figure 1 is a schematic circuit diagram of a vibration measuring unit according to the present invention.

Figure 2:
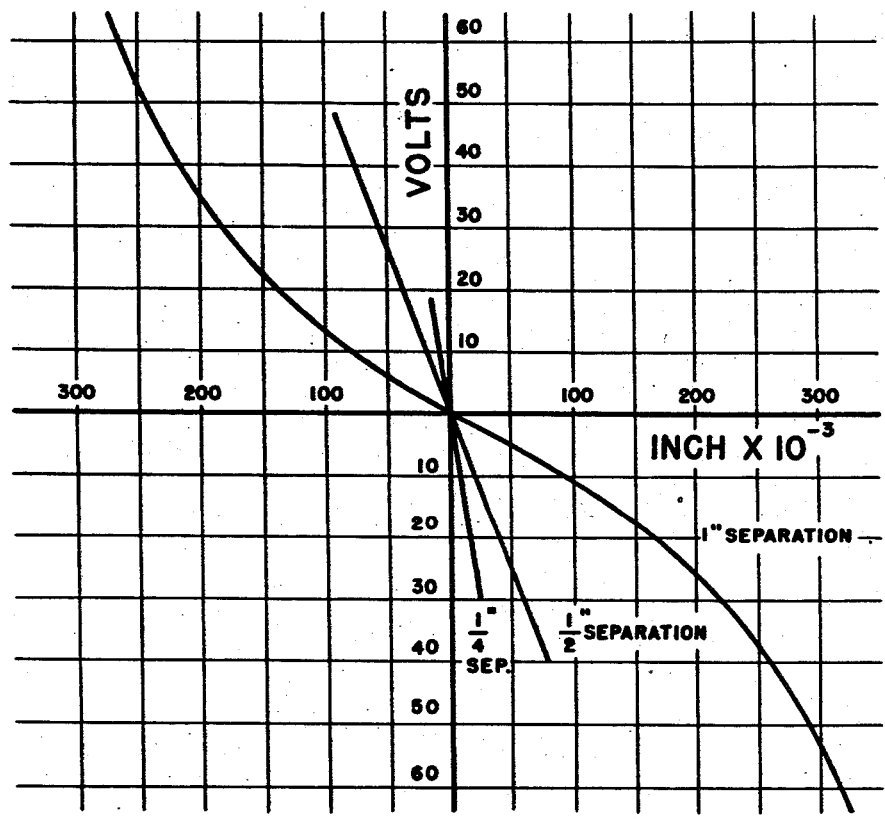
Figure 3:
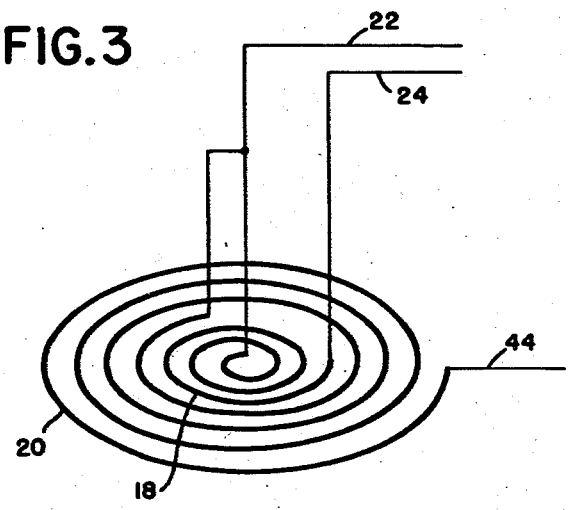

Fig. 2 is a graph showing the linear relation between secondary voltage and spacing of the pick-up coils from a metal plate for small amplitudes of vibration, and Fig. 3 is a top view showing the concentric arrangement of primary and secondary coils in the mutual inductance pick-up according to the preferred form of the invention.

As shown in Figure 1, the device is used for the sensing and measurement of vibrations in a rotary disk or table 10. Table 10 is supported on a vertical shaft 12 for rotation at predetermined speeds with a high degree of accuracy. Such a device may be useful, for example, as a rate table on which rate gyros may be mounted as shown at 14 for testing under suitable conditions of rotation and acceleration. In any such testing procedure it is extremely important to have an accurate measure of the amplitude and frequency of any vibrations to which the apparatus may be subjected. For example, the upper surface of table 10 is normally expected to remain in a single predetermined plane and to rotate within that plane around the axis of shaft 12. Should portions of the table deviate from the circular path in such plane, i. e., in a direction parallel to the axis of shaft 12, the extent and frequency of any such variations should be known and must be accurately determined.

For this purpose, according to one preferred form of the present invention, a mutual inductance pick-up, indicated generally at 16, is mounted closely adjacent the surface of the rotating metallic or magnetically permeable plate 10. This pick-up includes a primary coil 18 and a secondary coil 20, the mutual inductance between which varies according to their proximity to the magnetically permeable plate 10. Thus any deviations of the portions of plate 10 from an exact path within the plane of the table surface will cause movement of a corresponding portion of plate 10 toward or away from the fixed coils 18 and 20 and will thus change the mutual inductance between them.

In order to utilize this variation in mutual inductance as a means of obtaining a visual indication of the amplitude and frequency of the particular vibration, the primary coil 18 is connected through wires 22 and 24 with a radio frequency signal generator indicated schematically at 26. This R. F. generator includes an oscillator tube 28 connected in circuit with a suitable inductance 30 and capacitance 32. The circuit is grounded at 34 a one end of the primary coil 18, while the plate 36 of the oscillator is connected to a suitable positive plate voltage supply as indicated at 38. The negative of the plate supply circuit shown at 40 is grounded to complete the circuit. For convenience, the energizing connections for the oscillator tube filament 42 have been omitted.

The circuit constants of the generator elements will be adjusted in known manner to provide a radio frequency signal of the desired amplitude and frequency. In the particular embodiment shown, a three megacycle signal is generated.

The actual arrangement of coils 18 and 20 is shown in detail in Figure 3. Here it will be noted that the coils 18 and 20 are both of the pancake type, each coil being wound in substantially the form of a helix. The coils are concentrically arranged with the primary coil 18 inside the secondary coil 20.

Under these circumstances, the voltage variations in the secondary caused by changes in mutual inductance between primary and secondary resulting from vibrations of the plate 10 will be measured by a suitable indicating circuit. This indicating circuit includes a diode detector 48 having its plate 46 connected at 44 to the ungrounded end of secondary coil 20. The other end of secondary coil 20 is connected through a common tap with the line 22 which is grounded at 34 in the primary circuit.

Cathode 50 of diode detector 48 is connected to ground through resistor 51 and is in turn connected as shown at 52 with the control grid 54 of an electronic tube or valve 56. Plate 58 of tube 56 is connected at 60 to the positive plate supply terminal 38, while cathode 62 of tube 56 is connected through a cathode follower 64 to the ground at 66.

Under these circumstances, it will be understood that variations in the voltage of secondary coil 20, as detected by tube 48, will bias grid 54 so as to control the plate current through tube 56. The amplitude of the plate current in turn will determine the voltage drop across the cathode follower 64, and the voltage variations across the cathode follower may be indicated visually by a suitable oscilloscope 68. For this purpose a D. C. scope of high accuracy is desired, and the input terminals 70 and 72 of the scope are connected at 74 and 76, respectively, to the ends of the cathode follower 64.

As shown in Fig. 2, the voltage from the secondary of the pick-up coil varies approximately linearly for a small change in the air gap between the coils and the metal plate or table 10. The voltage shown in Fig. 2 is the output voltage of the diode detector and cathode follower which are connected to the secondary coil as described. It will be apparent that at small spacings (less than one-quarter of an inch) the sensitivity of this unit is in the neighborhood of one and one-half volts per thousandths of an inch. This voltage, when impressed on the input to a D. C. oscilloscope, such as a Tektronics 512, will show a deflection of about one centimeter for 25 millionths of an inch displacement of the table with respect to the pick-up. As indicated also in Fig. 2, the sensitivity depends to some extent on the initial separation between the plate or table 10 and the coils 18, 20.

The desired sensitivity and stability of the unit are achieved not only by the use of concentric pancake type coils, but also by the use of ceramic coil forms, a battery power supply, and mechanical rigidity within the unit.

A vibration sensing and indicating unit has accordingly been provided which substantially accomplishes the objects set forth at the beginning of the present specification and makes it possible to sense vibration amplitudes down to ten millionths of an inch at frequencies from zero to over 20,000 cycles. The particlar circuit connections facilitate the visual presentation of the amplitude and frequency of the vibrations. Moreover, when the sensing of vibrations in other relative directions is desired, it is possible to utilize similar units oriented so that vibrations in such other directions will change the mutual inductance between the primary and secondary pick-up coils in the same manner that axial vibrations of the table 10 change the mutual inductance between coils 18 and 20 of the above example.

Since minor variations and changes in the exact details of construction and in the circuit arrangement will be apparent to persons skilled in this field, it is intended that this invention shall cover all such changes and modifications as fall within the spirit and scope of the attached claims.

Now, therefore, I claim:

1. A vibration tester for a rotating metallic plate comprising a mutual inductance pick-up having primary and secondary coils fixed closely adjacent to each other and to the path of rotation of said plate whereby to be inductively coupled by said plate, a radio-frequency generator connected to said primary coil and applying an R. F. signal thereto, and indicating means responsive to variations in amplitude and frequency of the voltage in said secondary coil and thereby showing the amplitude and frequency of vibration of the plate whenever the plate deviates from said path of rotation and changes the coupling between said coils, said indicating means including a diode detector in circuit with said secondary coil, a cathode follower controlled by said detector, and oscilloscope means connected across the cathode follower.

2. A vibration tester according to claim 1 in which said pick-up includes pancake type primary and secondary coils substantially concentric with each other in a common plane, the primary coil being inside the secondary coil.

3. A vibration tester for a moving metallic plate comprising a mutual inductance pick-up having primary and secondary coils fixed closely adjacent to each other and to the path of movement of said plate thereby to be inductively coupled by said plate, a radio-frequency generator connected to said primary coil and applying an R. F. signal thereto, and indicating means responsive to variations in amplitude and frequency of the voltage in said secondary coil and thereby showing the amplitude and frequency of vibration of the plate whenever the plate deviates from said path of movement and changes the coupling between said coils, said indicating means including a diode detector in circuit with said secondary coil, an electronic valve having a control grid connected to the detector and controlling the passage of current through the valve in response to variations in secondary coil voltage passing through said detector, a cathode resistor connected in circuit with the electronic valve, and an oscilloscope having an input circuit connected across the cathode resistor.

4. A vibration tester according to claim 3 in which said pick-up includes substantially concentric pancake type primary and secondary coils arranged in the same plane.

5. Apparatus for testing the wobble or vibration of a rotatable plate such as a gyroscope rate table, the apparatus consisting of a mutual inductance pick-up having concentric pancake stationary primary and secondary coils fixedly mounted in the same general plane and on the same side of said plate, said coils being closely adjacent to each other and to the path of movement of said plate and mechanically independent of said plate thereby to be inductively coupled by said plate, a radio-frequency generator connected to said primary coil and applying an R. F. signal thereto, and indicating means responsive to variations in amplitude and frequency of the voltage in said secondary coil and thereby showing the amplitude and frequency of vibration of the plate whenever the plate deviates from said path of movement and changes the coupling between said coils.

References Cited in the file of this patent

UNITED STATES PATENTS

| | | |
|---|---|---|
| 1,640,464 | Mershon | Aug. 30, 1927 |
| 1,792,249 | Serduke | Feb. 10, 1931 |
| 2,340,609 | Mestas | Feb. 1, 1944 |
| 2,396,394 | Shaw | Mar. 12, 1946 |
| 2,439,047 | Grinstead et al. | Apr. 6, 1948 |
| 2,483,410 | Grieg et al. | Oct. 4, 1949 |
| 2,512,658 | Levy | June 27, 1950 |
| 2,629,004 | Greenough | Feb. 17, 1953 |

FOREIGN PATENTS

| | | |
|---|---|---|
| 201,985 | Great Britain | Aug. 1, 1923 |